United States Patent
Maeda

(10) Patent No.: US 8,223,914 B2
(45) Date of Patent: Jul. 17, 2012

(54) SPENT FUEL STORAGE RACK

(75) Inventor: Manabu Maeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 12/373,059

(22) PCT Filed: Feb. 12, 2008

(86) PCT No.: PCT/JP2008/052272
§ 371 (c)(1),
(2), (4) Date: Jan. 9, 2009

(87) PCT Pub. No.: WO2008/099815
PCT Pub. Date: Aug. 21, 2008

(65) Prior Publication Data
US 2009/0207962 A1    Aug. 20, 2009

(30) Foreign Application Priority Data
Feb. 13, 2007  (JP) ................... 2007-032378

(51) Int. Cl.
G21C 19/00   (2006.01)
(52) U.S. Cl. .................... 376/272; 250/506.1
(58) Field of Classification Search ........... 376/272; 250/506.1
See application file for complete search history.

(56) References Cited

U.S. PATENT DOCUMENTS 5,668,843 A * 9/1997 Wasinger ............... 376/272
5,898,747 A * 4/1999 Singh ..................... 376/272
6,674,827 B2 * 1/2004 de la Pena et al. ........ 376/272
2003/0223529 A1  12/2003 De la Pena et al.

FOREIGN PATENT DOCUMENTS

| JP | 2001 74878 | | 3/2001 |
| JP | 2002 107485 | | 4/2002 |
| JP | 2002-107485 | * | 4/2002 |
| JP | 2003 14882 | | 1/2003 |

\* cited by examiner

Primary Examiner — Ricardo Palabrica
(74) Attorney, Agent, or Firm — Oblon, Spivak, McClelland, Maier & Neustadt, L.L.P.

(57) ABSTRACT

A spent fuel storage rack 1 according to the present invention is installed in a fuel storage pool of a nuclear facility, and has a rectangular parallelepiped shape forming a plurality of lattice-like cells 2a that are configured to separately accommodate a plurality of fuel assemblies in a matrix of rows and columns. As shown in FIG. 1, the spent fuel storage rack 1 includes: a base 17 configured to support lower parts of fuel assemblies, the base 17 forming a bottom surface of the spent fuel storage rack 1; an outer frame 3 located above the base 17, the outer frame 3 forming an outermost periphery of the spent fuel storage rack 1; and a lattice body 2 disposed inside the outer frame 3, the lattice body 2 forming the lattice-like cells 2a. The lattice body 2 includes: a main lattice 4 having a height equivalent to an active length of the fuel assembly; an upper lattice 5 disposed above the main lattice 4 so as to be fitted to an upper end of the main lattice 4; and a lower lattice 6 disposed between the base 17 and the main lattice 4 so as to be fitted to a lower end of the main lattice 4. Thus, the main lattice 4 can be formed without welding, whereby the main lattice 4 can be made of a boron-added stainless steel to which a sufficient amount of boron is added to absorb neutrons.

1 Claim, 6 Drawing Sheets

SPENT FUEL STORAGE RACK

FIELD OF THE INVENTION

The present invention relates to a spent fuel storage rack installed in a fuel storage pool of a nuclear facility, the spent fuel storage rack having a rectangular parallelepiped shape forming lattice-like cells that are configured to separately accommodate a plurality of fuel assemblies in a matrix of rows and columns. In particular, the present invention pertains to a spent fuel storage rack to which a neutron absorption function can be imparted.

BACKGROUND ART

In an atomic power plant, spent fuels, which are taken out from a reactor core after an atomic power reactor has been operated for a certain period of time, are conventionally accommodated and stored in a spent fuel storage rack installed in a fuel storage pool, until a reprocessing is performed. In the spent fuel storage rack, the spent fuels are cooled for removing a decay heat thereof. In recent years, it has been required to increase a storage capacity of spent fuels by effectively utilizing a space in the fuel storage pool. In order to cope with this requirement, a distance between the stored spent fuels is narrowed, while a non-critical state between the fuels is maintained by interposing a material having a neutron absorption ability between the stored spent fuels. The interposed member also serves as a reinforcing member that supports the stored spent fuels, when an earthquake occurs. In this manner, there has been proposed a spent fuel storage rack capable of increasing a denseness.

As such a spent fuel storage rack, there has been known a spent fuel storage rack of a so-called lattice-like cell structure in which boron-added stainless steel plates, which are excellent in neutron absorption ability and in structural strength, are interposed one by one between stored spent fuels (for example, JP2000-258538A).

However, the boron-added stainless steel has a following disadvantageous feature. Namely, as an amount of added boron increases, a welding operation is more likely to impair a material strength of the boron-added stainless steel. Thus, when lattice plate members using the boron-added stainless steel are integrated by welding to form a lattice plate, an amount of boron to be added is limited, which limits an ability to absorb neutrons.

Further, when lattice plate members are integrated by welding to form a lattice plate, the welding operation is complicated, because lattice-like cells are adjacent to each other. Furthermore, since the welding operation has to be performed in the narrow lattice-like cells, it is necessary to use a special jig, which is economically disadvantageous.

SUMMARY OF THE INVENTION

The present invention has been made in view of the above circumstances. The object of the present invention is to provide a spent fuel storage rack in which a part of a lattice body corresponding to fuel assemblies can be formed without welding, whereby the part of the lattice body corresponding to fuel assemblies can be formed of a boron-added stainless steel to which a sufficient amount of boron is added so as to absorb neutrons.

The present invention is a spent fuel storage rack installed in a fuel storage pool of a nuclear facility, the spent fuel storage rack having a rectangular parallelepiped shape forming a plurality of lattice-like cells that are configured to separately accommodate a plurality of fuel assemblies in a matrix of rows and columns, the spent fuel storage rack comprising: a base configured to support lower parts of fuel assemblies, the base forming a bottom surface of the spent fuel storage rack; an outer frame located above the base, the outer frame forming an outermost periphery of the spent fuel storage rack; and a lattice body disposed inside the outer frame, the lattice body forming the lattice-like cells; wherein the lattice body includes: a main lattice located on a position corresponding to the fuel assemblies, the main lattice having a height equivalent to an active length of the fuel assembly; an upper lattice disposed above the main lattice so as to be fitted to an upper end of the main lattice; and a lower lattice disposed between the base and the main lattice so as to be fitted to a lower end of the main lattice.

The present invention is the spent fuel storage rack wherein: the main lattice has a plurality of flat lattice plates for main lattice that are arranged in parallel with each other in an x direction and extended over the overall length of the main lattice in the x direction, and a plurality of strip-like lattice plates for main lattice that are arranged in parallel with each other in a y direction perpendicular to the x direction and extended between the respective flat lattice plates for main lattice; and the respective strip-like lattice plates for main lattice are fitted in the corresponding flat lattice plates for main lattice.

The present invention is the spent fuel storage rack, wherein: the upper lattice includes a plurality of flat lattice plates for upper lattice that are arranged in parallel with each other in the x direction and extended over the overall length of the upper lattice in the x direction, and a plurality of strip-like lattice plates for upper lattice that are arranged in parallel with each other in the y direction perpendicular to the x direction and extended between the respective flat lattice plates for upper lattice; and the respective strip-like lattice plates for upper lattice are integrated with the corresponding flat lattice plates for upper lattice by welding.

The present invention is the spent fuel storage rack, wherein: the lower lattice includes a plurality of flat lattice plates for lower lattice that are arranged in parallel with each other in the x direction and extended over the overall length of the lower lattice in the x direction, and a plurality of strip-like lattice plates for lower lattice that are arranged in parallel with each other in the y direction perpendicular to the x direction and extended between the respective flat lattice plates for lower lattice; and the respective strip-like lattice plates for lower lattice are integrated with the corresponding flat lattice plates for lower lattice by welding.

The present invention is the spent fuel storage rack, wherein the respective flat lattice plates for upper lattice are divided at positions where the flat lattice plates for upper lattice are joined to the corresponding strip-like lattice plates for upper lattice.

The present invention is the spent fuel storage rack, wherein the respective flat lattice plates for lower lattice are divided at positions where the flat lattice plates for lower lattice are joined to the corresponding strip-like lattice plates for lower lattice.

The present invention is the spent fuel storage rack, wherein the outer frame, the upper lattice, and the lower lattice are made of a stainless steel.

The present invention is the spent fuel storage rack, wherein the outer frame, the upper lattice, and the lower lattice are made of a boron-added stainless steel having a smaller amount of added boron than that of the main lattice, or an enriched boron-added stainless steel.

The present invention is the spent fuel storage rack, wherein the main lattice is made of a metal material such as hafnium that absorbs neutrons.

According to the present invention, the main lattice, which is located on a position corresponding to the fuel assemblies and has a height equivalent to an active length of the fuel assembly, is fitted in the upper lattice and the lower lattice and secured thereto. Thus, when the main lattice is assembled and secured, it is not necessary to perform a welding operation to the main lattice. Thus, as a material for the main lattice, it is possible to employ a boron-added stainless steel to which a sufficient amount of boron is added to absorb neutrons. Accordingly, the main lattice can have a sufficient ability to absorb neutrons.

In addition, according to the present invention, since it is not necessary to perform a welding operation to the main lattice for securing the main lattice, a welding amount in the lattice body can be significantly reduced as a whole. Further, the present invention eliminates the use of a special jig for the welding operation performed in the narrow lattice-like cells, which is economically advantageous.

BEST MODE FOR CARRYING OUT THE INVENTION

First Embodiment

Figure 1:
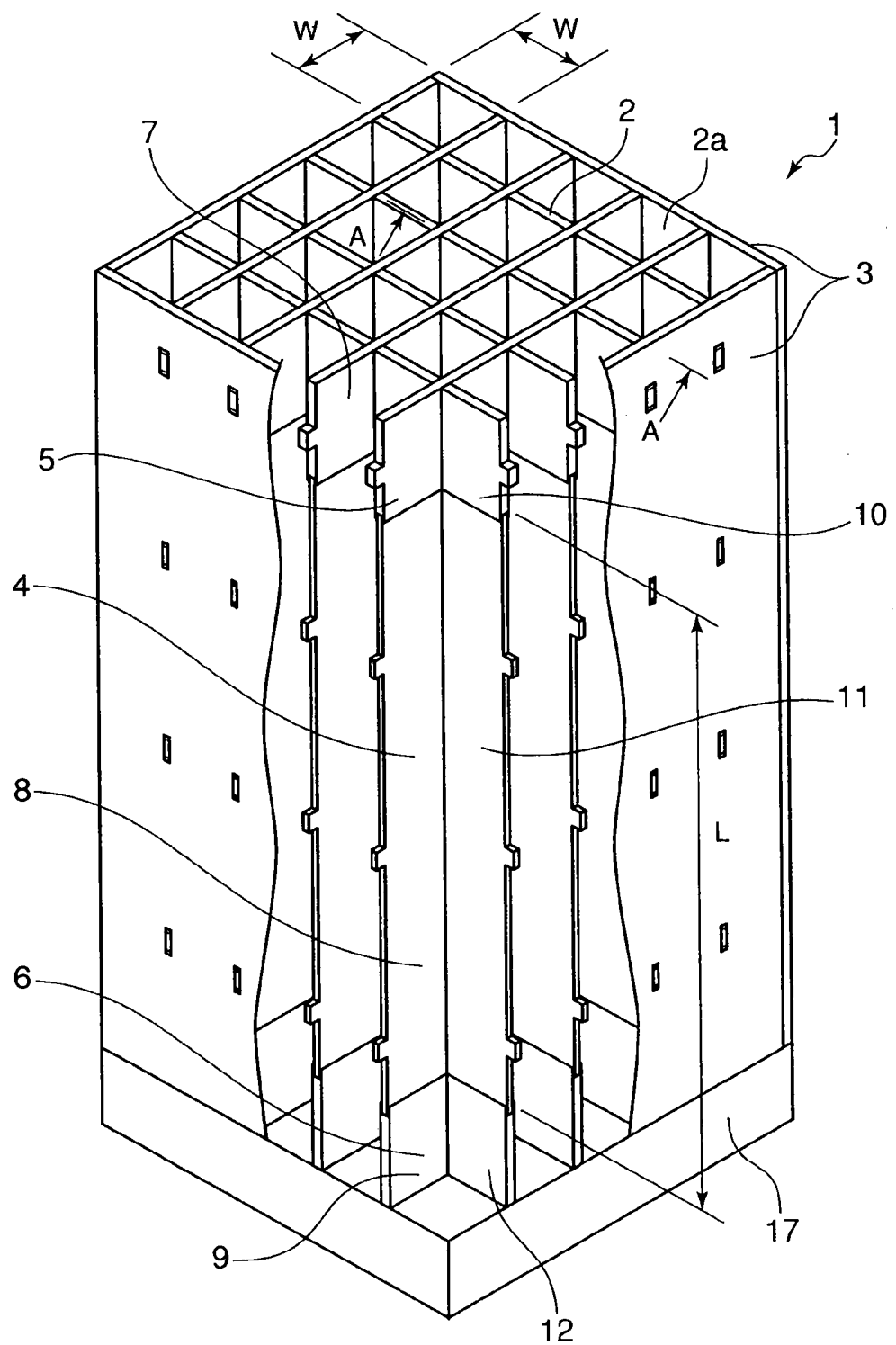
FIG. 1 is a perspective view showing an overall structure of a spent fuel storage rack.
Figure 2:
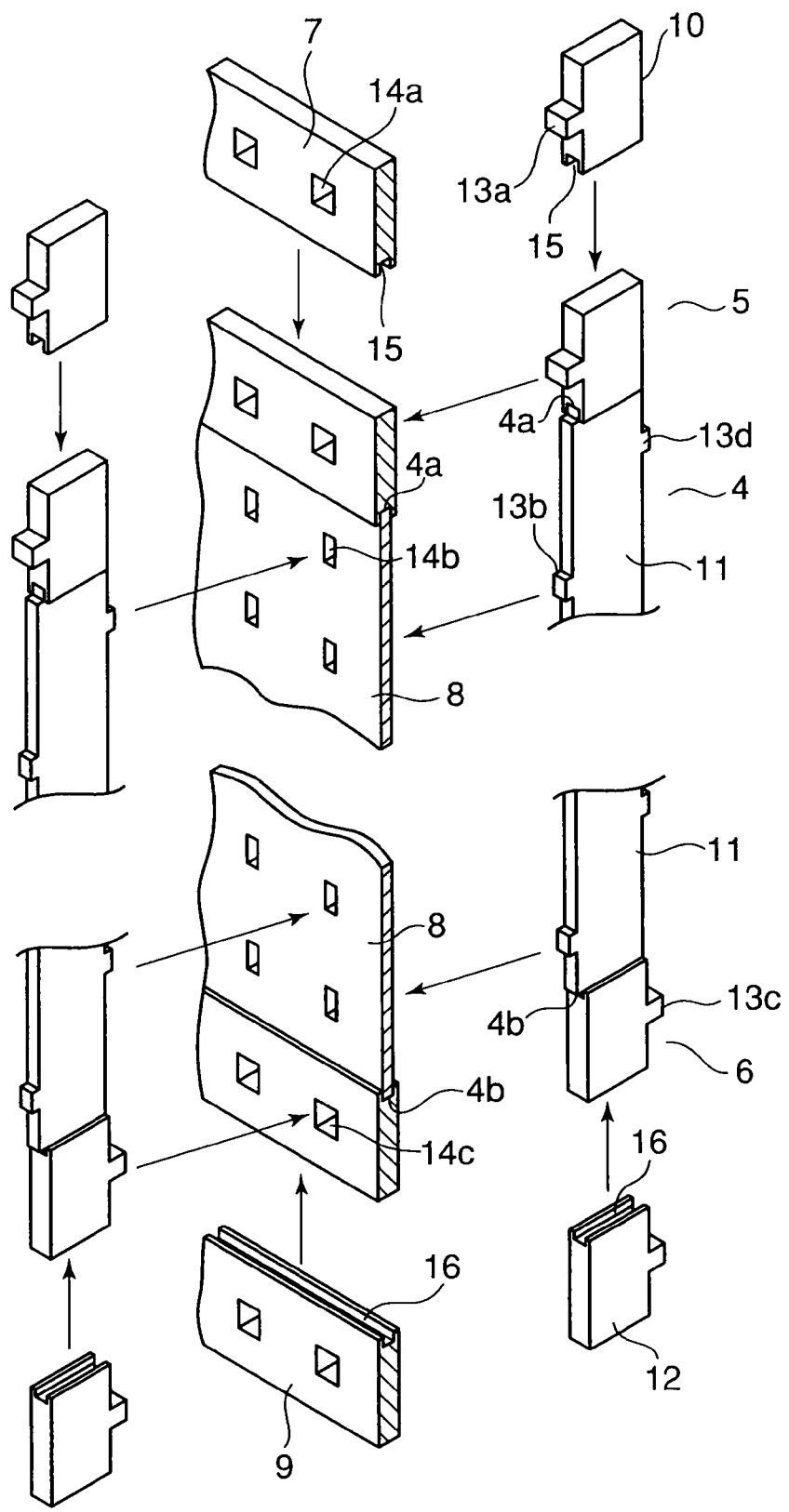
FIG. 2 is a perspective view showing structures of respective lattice parts.
Figure 3:
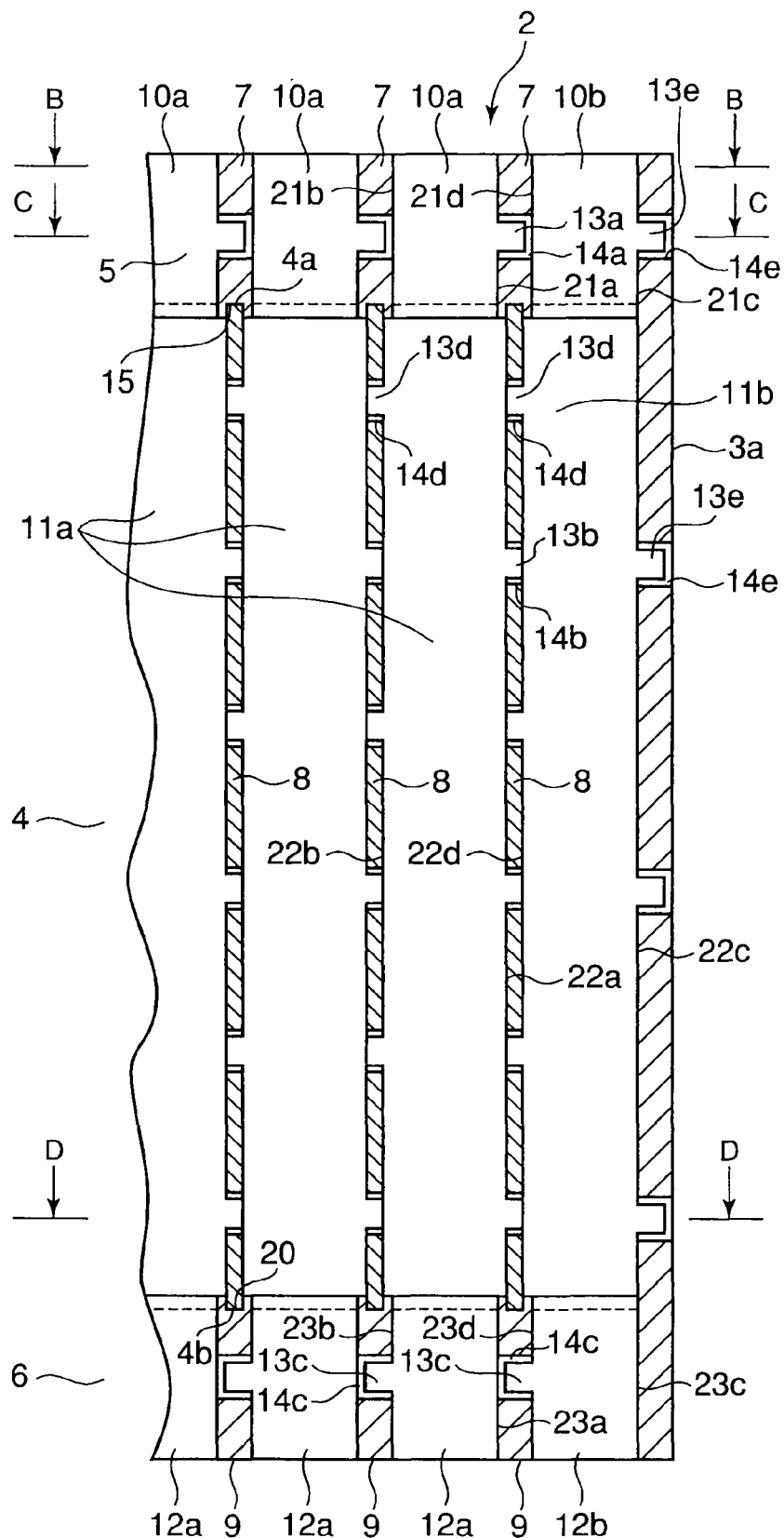
FIG. 3 is a cross-sectional view taken along the line A-A in FIG. 1.
Figure 4:
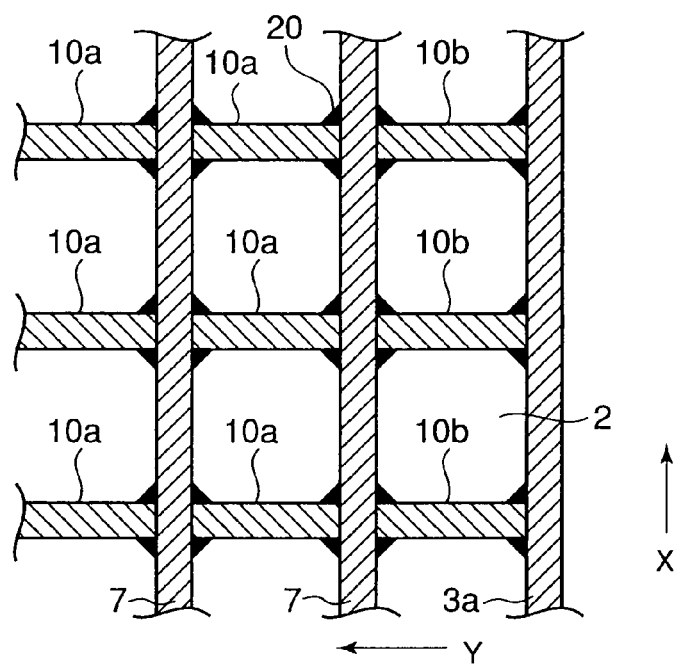
FIG. 4 is a cross-sectional view taken along the line B-B in FIG. 3.
Figure 5:
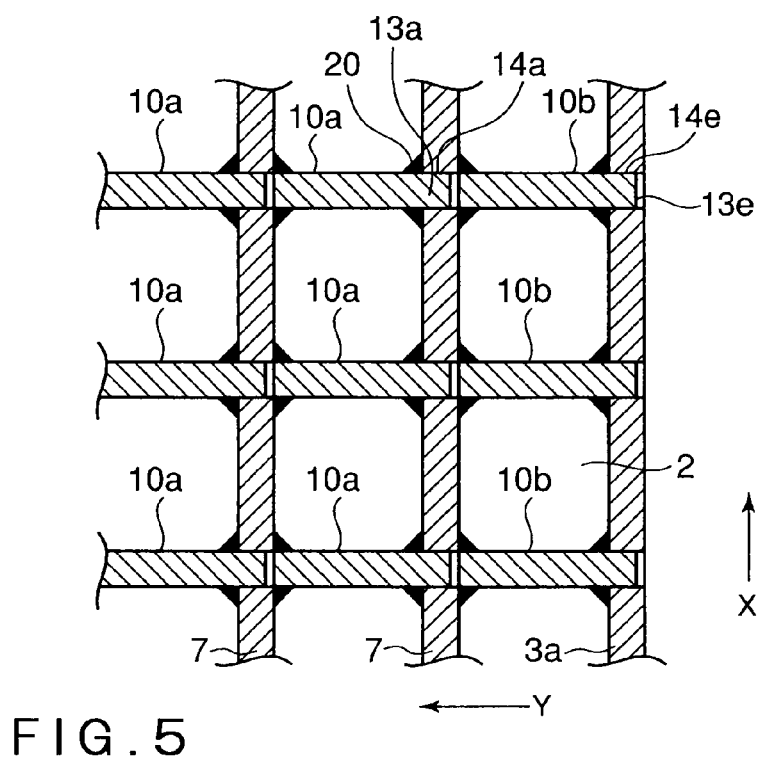
FIG. 5 is a cross-sectional view taken along the line C-C in FIG. 3.
Figure 6:
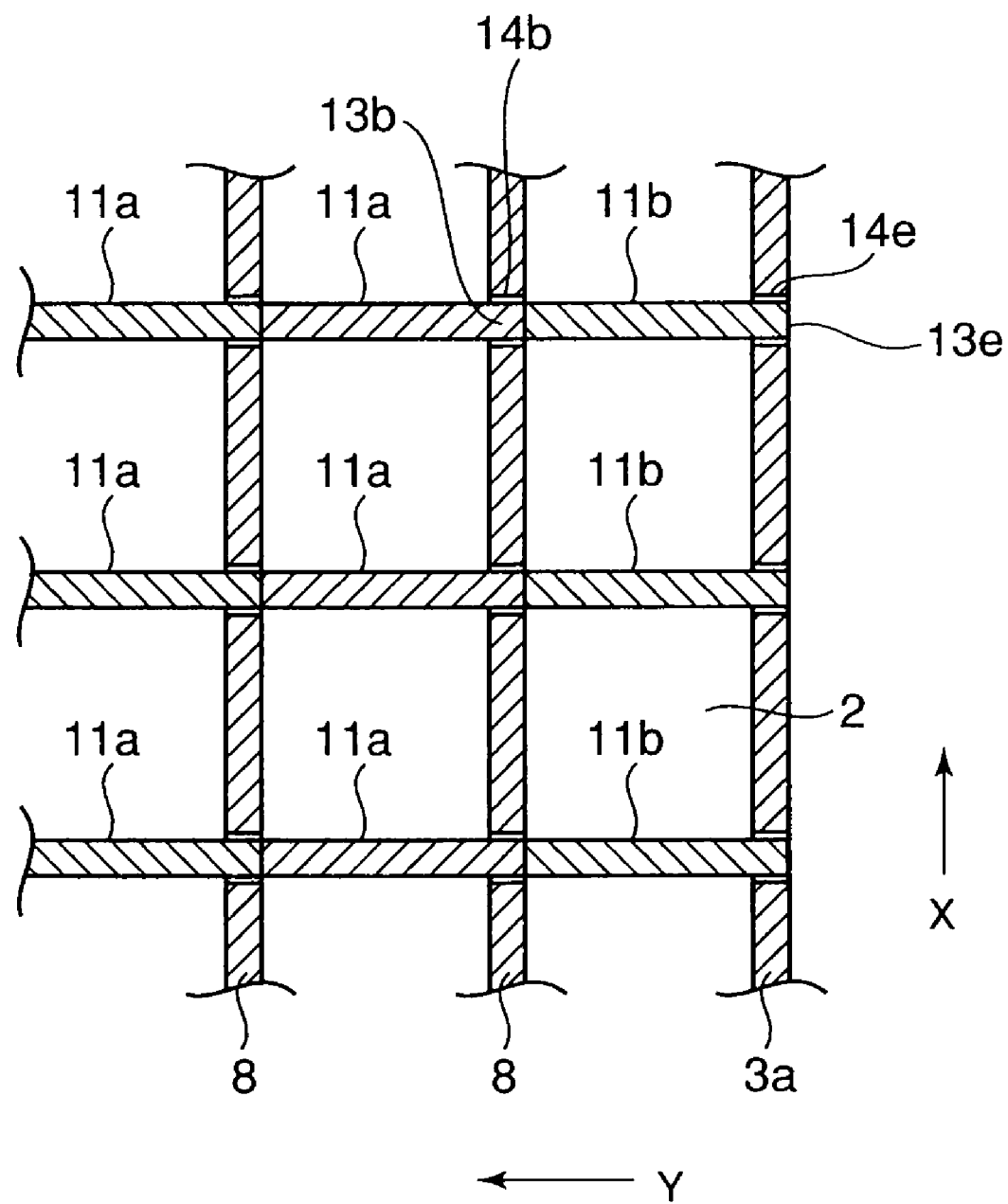
FIG. 6 is a cross-sectional view taken along the line D-D in FIG. 3.

Embodiments of the present invention will be described with reference to the drawings. FIGS. 1 to 6 are views showing a first embodiment of a spent fuel storage rack according to the present invention. FIG. 1 is a perspective view showing an overall structure of the spent fuel storage rack. FIG. 2 is a perspective view showing structures of respective lattice parts. FIG. 3 is a cross-sectional view taken along the line A-A in FIG. 1. FIG. 4 is a cross-sectional view taken along the line B-B in FIG. 3. FIG. 5 is a cross-sectional view taken along the line C-C in FIG. 3. FIG. 6 is a cross-sectional view taken along the line D-D in FIG. 3.

The overall structure of the spent fuel storage rack 1 in the first embodiment of the present invention is described at first, with reference to FIG. 1. The spent fuel storage rack 1 according to the present invention is installed in a fuel storage pool of a nuclear facility, and has a rectangular parallelepiped shape forming a plurality of lattice-like cells 2a that are configured to separately accommodate a plurality of fuel assemblies in a matrix of rows and columns. In this case, each of the lattice-like cells 2a has a length W and a width W corresponding to a shape of the fuel assembly.

As shown in FIG. 1, the spent fuel storage rack 1 includes: a base 17 configured to support lower parts of fuel assemblies, the base 17 forming a bottom surface of the spent fuel storage rack 1; an outer frame 3 located above the base 17, the outer frame 3 forming an outermost periphery of the spent fuel storage rack 1; and a lattice body 2 disposed inside the outer frame 3, the lattice body 2 forming the lattice-like cells 2a. The lattice body 2 includes: a main lattice 4 located on a position corresponding to the fuel assemblies, the main lattice 4 having a height equivalent to an active length L of the fuel assembly; an upper lattice 5 disposed above the main lattice 4 so as to be fitted to an upper end of the main lattice 4; and a lower lattice 6 disposed between the base 17 and the main lattice 4 so as to be fitted to a lower end of the main lattice 4.

In this case, an upper end surface 4a of the main lattice 4 is fitted in a groove 15 formed in a lower end surface of the upper lattice 5. A lower end surface 4b of the main lattice 4 is fitted in a groove 16 formed in an end surface of the lower lattice 6. Thus, the main lattice 4, the upper lattice 5, and the lower lattice 6 are integrated and assembled with each other (see, FIG. 2).

Next, the main lattice 4, the upper lattice 5, and the lower lattice 6, which constitute the lattice body 2, are described in detail with reference to FIG. 2.

The main lattice 4 is firstly described. The main lattice 4 has a plurality of flat lattice plates for main lattice 8 that are arranged in parallel with each other in an x direction and extended over the overall length of the main lattice 4 in the x direction, and a plurality of strip-like lattice plates for main lattice 11 that are arranged in parallel with each other in a y direction perpendicular to the x direction and extended between the respective flat lattice plates for main lattice 8 (see, FIG. 1).

The main lattice 4, which is composed of the flat lattice plates for main lattice 8 and the strip-like plates for main lattice 11, is located on a position corresponding to fuel assemblies, and has a height equivalent to an active length L of the fuel assembly. The strip-like lattice plates for main lattice 11 are formed of strip-like lattice plates for main lattice 11b that are in contact with flat lattice plates for outer frame 3a that constitute the outer frame 3, and other strip-like lattice plates for main lattice 11a.

Formed in one surface of the flat lattice plate for main lattice 8 are slits 14b and 14d in which projections 13b and 13d formed on the strip-like lattice plates for main lattice 11a and 11b are fitted. Thus, by bringing end surfaces of the strip-like lattice plates for main lattice 11a and 11b into contact with the surfaces of the flat lattice plates for main lattice 8, and by inserting the projections 13b and 13d of the strip-like lattice plates for main lattice 11a and 11b into the slits 14b and 14d of the flat lattice plates for main lattice 8, there can be constituted the main lattice 4 which is located on a position corresponding to fuel assemblies and has a height equivalent to an active length L of the fuel assembly. The projection 13b formed on the strip-like lattice plate for main lattice 11a is formed on one end surface 22a of the strip-like lattice plate for main lattice 11a, while the projection 13d is formed on the other end surface 22b of the strip-like lattice plate for main lattice 11a (see, FIG. 3). In addition, a projection 13e is formed on one end surface 22c of the strip-like lattice plate for main lattice 11b, while the projection 13d is formed on the other end surface 22d of the strip-like lattice plate for main lattice 11b. The projection 13e of the strip-like lattice plate for main lattice 11b is fitted in a slit 14e of the flat lattice plate for outer frame 3a.

Next, the upper lattice 5 is described.

The upper lattice 5 includes a plurality of flat lattice plates for upper lattice 7 that are arranged in parallel with each other in the x direction and extended over the overall length of the upper lattice in the x direction, and a plurality of strip-like lattice plates for upper lattice 10 that are arranged in parallel with each other in the y direction perpendicular to the x direction and extended between the respective flat lattice plates for upper lattice 7. The strip-like lattice plates for upper lattice 10 are formed of strip-like lattice plates for upper lattice 10b that are in contact with the flat lattice plates for outer frame 3a, and other strip-like lattice plates for upper lattice 10a.

Formed in one surface of the flat lattice plate for upper lattice 7 is a slit 14a in which a projection 13a formed on an end surface 21a of the strip-like lattice plate for upper lattice 10a is fitted. Thus, by bringing the end surface of the strip-like lattice plate 10a into contact with the surface of the flat lattice plate for upper lattice 7, and by inserting the projection 13a of the strip-like lattice pale for upper lattice 10a into the slit 14a of the flat lattice plate for upper lattice 7, the upper lattice 5 can be constituted (see, FIG. 3). A projection 13e is formed on an end surface 21c of the strip-like lattice plate for upper lattice 10b. The projection 13e of the strip-like lattice plate for upper lattice 10b is fitted in a slit 14e of the flat lattice plate for outer frame 3a.

Next, the lower lattice 6 is described.

The lower lattice 6 includes a plurality of flat lattice plates for lower lattice 9 that are arranged in parallel with each other in the x direction and extended over the overall length of the lower lattice 6 in the x direction, and a plurality of strip-like lattice plates for lower lattice 12 that are arranged in parallel with each other in the y direction perpendicular to the x direction and extended between the respective flat lattice plates for lower lattice 9. The strip-like lattice plates for lower lattice 12 are formed of strip-like lattice plates for lower lattice 12b that are in contact with the flat plates for outer frame 3a, and other strip-like plates for lower lattice 12a.

Formed in one surface of the flat lattice plate for lower lattice 9 is a slit 14c in which a projection 13c formed on an end surface 23b of the strip-like lattice plate for lower lattice 12a is fitted. Thus, by bringing the end surface of the strip-like lattice plate for lower lattice 12a to the surface of the flat lattice plate for lower lattice 9, and by inserting the projection 13c of the strip-like lattice plate for lower lattice 12a into the slit 14c of the flat lattice plate for lower lattice 9, the lower lattice 6 can be constituted (see, FIG. 3).

Next, with reference to FIG. 3, there are described: a relationship between the projections 13b and 13d formed on the strip-like lattice plate for main lattice 11a and the projections 13d and 13e formed on the strip-like lattice plate for main lattice 11b, and the slits 14b, 14d, and 14e formed in the flat lattice plate for main lattice 8 and the flat lattice plate for outer frame 3a; a relationship between the projection 13a formed on the strip-like lattice plate for upper lattice 10a and the projection 13e formed on the strip-like lattice plate for upper lattice 10b, and the slits 14a and 14e formed in the flat lattice plate for upper lattice 7 and the flat lattice plate for outer frame 3a; and a relationship between the projection 13c formed on the strip-like lattice plate for lower lattice 12a and the strip-like lattice plate for lower lattice 12b, and the slit 14c formed in the flat lattice plate for lower lattice 9.

In the first place, a relationship between the strip-like lattice plate for main lattice 11, the flat lattice plate for main lattice 8, and the flat lattice plate for outer frame 3a is described.

The strip-like lattice plate for main lattice 11a is provided with the projection 13b on the end surface 22a to be combined with the flat lattice plate for main lattice 8, and is provided with the projection 13d on the end surface 22b opposite to the end surface 22a of the strip-like lattice plate for main lattice 11a. Formed in one surface of the flat lattice plate for main lattice 8 are the slit 14d corresponding to the projection 13b formed on the end surface 22a of the strip-like lattice plate for main lattice 11a, and the slit 14d corresponding to the projection 13d formed on the end surface 22b of the strip-like lattice plate for main lattice 11a. The projection 13b formed on the end surface 22a of the strip-like lattice plate for main lattice 11a and the projection 13d formed on the end surface 22b of the strip-like lattice plate for main lattice 11a are staggered from each other in a height direction. Thus, the projections 13b and the projection 13d are prevented from being simultaneously inserted into the identical slits 14b and 14d formed in the flat lattice plate for main lattice 8. Therefore, the end surface 22a and the end surface 22b of the strip-like lattice plate for main lattice 11a can be smoothly joined to the corresponding surfaces of the flat lattice plates for main lattice 8.

The strip-like lattice plate for main lattice 11b is provided with the projection 13e on the end surface 22c to be combined with the flat lattice plate for outer frame 3a, and is provided with the projection 13d on the end surface 22d opposite to the end surface 22c of the strip-like lattice plate for main lattice 11b. Formed in one surface of the flat lattice plate for outer frame 3a is the slit 14e corresponding to the projection 13e formed on the end surface 22c of the strip-like lattice plate for main lattice 11b. Formed in one surface of the flat lattice plate for main lattice 8 is the slit 14d corresponding to the projection 13d formed on the end surface 22d of the strip-like lattice plate for main lattice 11b. Thus, the end surface 22c of the strip-like lattice plate for main lattice 11b can be smoothly joined to the corresponding surface of the flat lattice plate for outer frame 3a, while the end surface 22d of the strip-like lattice plate for main lattice 11b can be smoothly joined to the corresponding surface of the flat lattice plate for main lattice 8.

Next, a relationship between the strip-like lattice plate for upper lattice 10, the flat lattice plate for upper lattice 7, and the flat lattice plate for outer frame 3a is described.

The strip-like lattice plate for upper lattice 10a is provided with the projection 13a on the end surface 21a to be combined with the flat lattice plate for upper lattice 7. Formed in one surface of the flat lattice plate for upper lattice 7 is the slit 14a corresponding to the projection 13a formed on the end surface 21a of the strip-like lattice plate for upper lattice 10a. Thus, the end surface 21a and the end surface 21b opposite to the end surface 21a of the strip-like lattice plate for upper lattice 10a can be smoothly joined to the corresponding surfaces of the flat lattice plates for upper lattice 7.

The strip-like lattice plate for upper lattice 10b is provided with the projection 13e on the end surface 21c to be combined with the flat lattice plate for outer frame 3a. Formed in one surface of the flat lattice plate for outer frame 3a is the slit 14e corresponding to the projection 13e formed on the end surface 21c of the strip-like lattice plate for upper surface 10b. Thus, the end surface 21c of the strip-like lattice plate for upper lattice 10b can be smoothly joined to the corresponding surface of the flat lattice plate for outer frame 3a, while an end surface 21d opposite to the end surface 21c of the strip-like lattice plate for upper lattice 10b can be smoothly joined to the corresponding surface of the flat lattice plate for upper lattice 7.

Next, a relationship between the strip-like lattice plate for lower lattice 12, the flat lattice plate for lower lattice 9, and the flat lattice plate for outer frame 3a is described.

The strip-like lattice plate for lower lattice 12a is provided with the projection 13c on the end surface 23b to be combined with the flat lattice plate for lower lattice 9. Formed in one surface of the flat lattice plate for lower lattice 9 is the slit 14c corresponding to the projection 13c formed on the end surface 23b of the strip-like lattice plate for lower lattice 12a. Thus, the end surface 23b and the end surface 23a opposite to the end surface 23b of the strip-like lattice plate for lower lattice 12a can be smoothly joined to the corresponding surfaces of the flat lattice plates for lower lattice 9.

The strip-like lattice plate for lower lattice 12b is provided with the projection 13c on the end surface 23d to be combined with the flat lattice plate for lower lattice 9. Formed in one surface of the flat lattice plate for lower lattice 9 is the slit 14c corresponding to the projection 13c formed on the end surface 23d of the strip-like lattice plate for lower lattice 12b. Thus, the end surface 23d of the strip-like lattice plate for lower lattice 12b can be smoothly joined to the corresponding surface of the flat lattice plate for main lattice 9, while an end surface 23c opposite to the end surface 23d of the strip-like lattice plate for lower lattice 12b can be smoothly joined to the corresponding surface of the flat lattice plate for outer frame 3a.

Next, with reference to FIGS. 4 to 6, there are described a method of joining the strip-like lattice plates for main lattice 11 and the flat lattice plates for main lattice 8 that constitute the main lattice 4, a method of joining the strip-like lattice plates for upper lattice 10 and the flat lattice plates for upper lattice 7 that constitute the upper lattice 5, and a method of joining the strip-like lattice plates for lower lattice 12 and the flat lattice plates for lower lattice 10 that constitute the lower lattice 6.

As shown in FIGS. 4 and 5, the strip-like lattice plates for upper lattice 10a and 10b and the flat lattice plates for main lattice 7 are integrated by an insertion operation in which the projections 13a are inserted into the slits 14a, and a welding operation succeeding thereto, whereby the upper lattice 5 can be obtained.

The strip-like lattice plates for lower lattice 12a and 12b and the flat lattice plates for lower lattice 9 are integrated by an insertion operation in which the projections 13c are inserted into the slits 14c, and a welding operation succeeding thereto, whereby the lower lattice 6 can be obtained.

As shown in FIG. 6, the strip-like lattice plates for main lattice 11a and 11b and the flat lattice plates for main lattice 8 are integrated by an insertion operation in which the projections 13b and 13d are inserted into the slits 14b and 14d, and by an adhesion operation succeeding thereto, whereby the main lattice 4 can be obtained.

In this case, the strip-like lattice plates for main lattice 11a and 11b and the flat lattice plates for main lattice 8 can be assembled without welding.

Next, an operation of the embodiment as structured above is described.

The main lattice 4, which is located on a position corresponding to fuel assemblies and has a height equivalent to an active length L of the fuel assembly, is fitted in the upper lattice 5 and the lower lattice 6 so as to be secured thereto. Thus, it is not necessary to weld the flat lattice plates for main lattice 8 and the strip-like lattice plates for main lattice 11 that constitute the main lattice 4, in order to assemble the main lattice 4. Therefore, as a material of the flat lattice plates for main lattice 8 and the strip-like lattice plates for main lattice 11 that constitute the main lattice 4, there can be employed a boron-added stainless steel to which a sufficient amount of boron is added to absorb neutrons. As a result, the main lattice 4 can have a sufficient ability to absorb neutrons.

Further, in the lattice body 2, it is not necessary to perform a welding operation to the flat lattice plates for main lattice 8 and the strip-like lattice plates for main lattice 11 in order to assemble the main lattice 4. In place thereof, the main lattice 4 can be assembled by welding the flat lattice plates for upper lattice 7 and the strip-like lattice plates for upper lattice 10 to assemble the upper lattice 5, and by welding the flat lattice plates for lower lattice 9 and the strip-like lattice plates for lower lattice 12 to assemble the lower lattice 6. Thus, when the whole lattice body 2 is assembled, the number of welded portions 20 can be remarkably reduced. In addition, it is no more necessary to use a special jig to perform a welding operation in the narrow lattice-like cells 2a whose depth is deeper than the active length L of the fuel assembly, which is economically advantageous.

Furthermore, a boron-added stainless steel can be used as a material of the flat lattice plates for main lattice 8 and the strip-like lattice plates for main lattice 11 that constitute the main lattice 4. Thus, it is not necessary to use a material capable of absorbing neutrons as a material of the other members excluding the main lattice 4, i.e., the outer frame 3, the upper lattice 5, and the lower lattice 6. Namely, a boron-free stainless steel can be used as a material of the outer frame 3, upper lattice 5, and the lower lattice 6. Thus, the outer frame 3, the upper frame 5, and the lower frame 6 can be integrated and assembled by welding. In this case, the main lattice 4, the upper lattice 5, and the lower lattice 6 are integrated with each other, with the upper end of the main lattice 4 being fitted in the upper lattice 5, and the lower end of the main lattice 4 being fitted in the lower lattice 6. As a result, the spent fuel storage rack 1 can have a sufficient structural strength against a large earthquake load.

A space between spent fuel assemblies stored in the outermost peripheral side of one spent fuel storage rack 1, and spent fuel assemblies stored in the outermost peripheral side of another spent fuel storage rack 1 adjacent thereto is doubly blocked by the outer frames 3 of the respective spent fuel storage racks 1. Moreover, a certain gap between the spent fuel storage rack 1 and the another spent fuel storage rack 1 adjacent thereto can be filled with water. Accordingly, the non-critical state between the fuels in the spent fuel assemblies accommodated in the spent fuel storage racks 1 can be supplemented.

Second Embodiment

Figure 7:
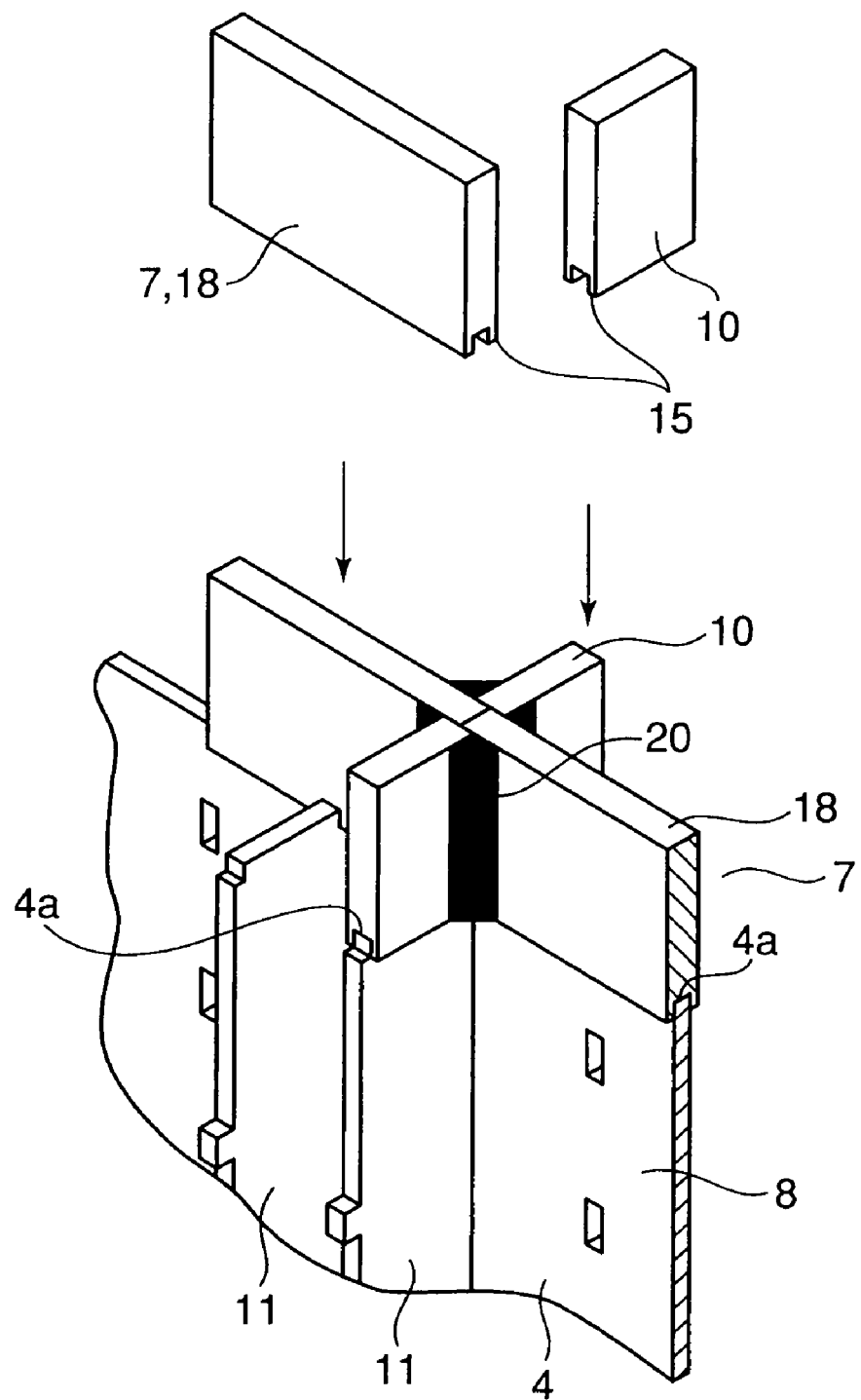
FIG. 7 is a perspective view showing structures of respective lattice parts.

Next, a second embodiment of the spent fuel storage rack according to the present invention will be described with reference to FIG. 7. FIG. 7 is a perspective view showing respective lattice parts.

In the second embodiment shown in FIG. 7, a flat lattice plate for upper lattice 7 constituting an upper lattice 5 is divided into lattice plates 18 at intersection points where the flat lattice plate for upper lattice 7 crosses the strip-like lattice plates for upper lattice 10. Other structures are substantially the same as those of the first embodiment shown in FIGS. 1 to 6.

In the embodiment shown in FIG. 7, the same parts as those of the first embodiment shown in FIGS. 1 to 6 are indicated by the same reference numbers, and detailed description thereof is omitted. A groove 15 in which an upper end surface 4a of a main lattice 4 is fitted is formed in lower end surfaces of the divided lattice plates 18 of the flat lattice plate for upper lattice 7. The groove 15 in which the upper end surface 4a of the main lattice 4 is fitted is also formed in a lower end surface of the strip-like lattice plate for upper lattice 10. These lattice plates 18 and the strip-like lattice plates for upper lattice 10 are integrated by welding at intersection points where the lattice plates 18 and 10 cross each other, to thereby form welded portions 20.

In addition, although not shown, similar to the upper lattice 5, a flat lattice plate for lower lattice 9 constituting a lower lattice 6 is divided into lattice plates at intersection points where the flat lattice plate for lower lattice 9 crosses the strip-like lattice plates for lower lattice 12. The divided lattice plates of the flat lattice plate for lower lattice 9 are welded to the strip-like lattice plates 12 at the intersection points.

In the second embodiment shown in FIG. 7, the flat lattice plate for upper lattice 7 of the upper lattice 5 is divided at the intersection points where the flat lattice plate for upper lattice 7 crosses the strip-like lattice plates for upper lattice 10, and the flat lattice plate for lower lattice 9 of the lower lattice 6 is divided at the intersection points where the flat lattice plate for lower lattice 9 crosses the strip-like lattice plates for lower lattice 12, which results in improvement in assembly work of the spent fuel storage rack 1.

Third Embodiment

Next, a third embodiment of the spent fuel storage rack according to the present invention is described with reference to FIGS. 1 to 6.

It can be expected that a higher ability to absorb neutrons is required for the spent fuel storage rack 1 because of an increased burn-up of fuels in the future.

In the third embodiment, an outer frame 3, an upper lattice 5, and a lower lattice 6 are made of a boron-added stainless steel having a smaller amount of added boron than that of a main lattice 4, or an enriched boron-added stainless steel. Other structures of the third embodiment are substantially the same as those of the first embodiment shown in FIGS. 1 to 6.

In this embodiment, the outer frame 3, the upper lattice 5, and the lower lattice 6 may be made of a boron-added stainless steel having a smaller amount of added boron than that of the main lattice 4, or an enriched boron-added stainless steel. In this case, even when the outer frame 3, the upper lattice 5, and the lower lattice 6 are welded to be assembled, there is no possibility that a material strength is impaired. Namely, when the outer frame 3, the upper lattice 5, and the lower lattice 6 are assembled, a welding operation can be employed. Accordingly, the spent fuel storage rack 1 can have a sufficient structural strength against a large earthquake load. In addition, since the outer frame 3, the upper lattice 5, and the lower lattice 6 respectively have an ability to absorb neutrons, the spent fuel storage rack 1 can have a higher ability to absorb neutrons.

Fourth Embodiment

Next, a fourth embodiment of the spent fuel storage rack according to the present invention is described with reference to FIGS. 1 to 6.

In the fourth embodiment, a main lattice 4 is made of a metal material such as hafnium that absorbs neutrons, in place of the boron-added stainless steel. Other structures of the fourth embodiment are substantially the same as those of the first embodiment shown in FIGS. 1 to 6.

In this embodiment, as a material of flat lattice plates for main lattice 8 and strip-like lattice plates for main lattice 11 that constitute a main lattice 4, there can be used a metal material such as hafnium that absorbs neutrons. Accordingly, the main lattice 4 can have a sufficient ability to absorb neutrons.

The invention claimed is:

1. A spent fuel storage rack for a nuclear facility, the spent fuel storage rack having a rectangular parallelepiped shape comprising a lattice having cells that are configured to separately accommodate a plurality of fuel assemblies in a matrix of rows and columns, the spent fuel storage rack comprising:
   a base configured to support lower parts of fuel assemblies, the base forming a bottom surface of the spent fuel storage rack;
   an outer frame located above the base, the outer frame forming an outermost periphery of the spent fuel storage rack; and
   a lattice body disposed inside the outer frame, the lattice body forming the cells;
   wherein the lattice body includes:
      a main lattice located at a position corresponding to the active part of the fuel assemblies, the main lattice having a height equivalent to an active length of the fuel assembly and made of boron-added stainless steel;
      an upper lattice disposed above the main lattice and above the active part of the fuel assemblies, and including a groove located so as to be fitted to an upper end of the main lattice; and
      a lower lattice disposed between the base and the main lattice and below the active part of the fuel assemblies, and including a groove located so as to be fitted to a lower end of the main lattice,
   wherein the main lattice made of boron-added stainless steel is fitted in the grooves of the upper lattice and the lower lattice and is thereby integrated therewith.

* * * * *